(12) United States Patent
Sheng

(10) Patent No.: US 7,518,766 B2
(45) Date of Patent: Apr. 14, 2009

(54) CALIBRATION MECHANISM OF A SCANNER

(75) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 11/518,704

(22) Filed: Sep. 11, 2006

(65) Prior Publication Data

US 2007/0070458 A1    Mar. 29, 2007

(30) Foreign Application Priority Data

Sep. 12, 2005    (TW) .............................. 94131250 A

(51) Int. Cl.
*H04N 1/04* (2006.01)
*H04N 1/40* (2006.01)

(52) U.S. Cl. ................. 358/487; 358/461; 358/475; 358/496; 358/498; 358/506; 358/509

(58) Field of Classification Search ............... 358/506, 358/509, 487, 475, 474, 505, 496, 498, 461, 358/406, 504; 250/234–236, 216, 239; 382/312, 382/318, 319, 274

See application file for complete search history.

(56) References Cited

U.S. PATENT DOCUMENTS

2003/0099002 A1* 5/2003 Yeh et al. ................. 358/464

* cited by examiner

*Primary Examiner*—Cheukfan Lee

(57) ABSTRACT

A calibration mechanism of a scanner includes a second light source, a calibration element having an opening, a first light source and a scanning module. The second light source is assembled with the calibration element, and the first light source is disposed at a position opposite to the calibration element. During the shading correction, the calibration element is rotated by an angle so that the first light source illuminates on a surface of the calibration element, and the reflected light enters the scanning module. When a transmissive original is being scanned, the light of the second light source passes through the opening of the calibration element and the transmissive original, and then enters the scanning module.

14 Claims, 6 Drawing Sheets

CALIBRATION MECHANISM OF A SCANNER

BACKGROUND OF THE INVENTION

1. Field of the Invention

The invention relates in general to a calibration mechanism mounted in a scanner, and more particularly to a scanner capable of scanning a transmissive document and a reflective document. The scanner may be a sheet-fed scanner, or a scan apparatus composed of an automatic document feeder and a flatbed scanner, and the scanner has two light sources.

2. Prior Art

Before scanning, a scanning module of a scanner first performs the white and dark shading correction. During the shading correction, a scan light source illuminates on a calibration sheet, which reflects light to the scanning module such that the white and dark shading correction and compensation can be performed. It is to be noted that if one of the scanning module and the calibration sheet can be moved relative to each other, the scanning module can obtain the reflected light corresponding to multiple scan lines, which is advantageous to the enhancement of the shading correction of the scanning module.

A typical document scanner, such as a sheet-fed scanner or a combination of a flatbed scanner and an automatic document feeder, generates an image signal corresponding to the document according to the reflected light from the surface of the document. In one configuration, the light source is installed on the chassis and the calibration sheet is disposed opposite the light source. When the scanning module is performing the calibration, the light source illuminates on the calibration sheet and the reflected light enters the scanning module.

When the above-mentioned scanner is used to scan a transmissive document, such as a film or a slide, the scanning light passes through the transmissive document and does not enter the scanning module.

One way to overcome this problem is to dispose a scanning module opposite the light source. Thus, the light passing through the transmissive document can enter the scanning module. However, since the calibration sheet has been disposed opposite the light source, the calibration sheet must be designed as a moveable device, or the light passing through the transmissive document would be obstructed by the calibration sheet. When the transmissive document is being scanned, the calibration sheet is moved to a suitable position without interfering with the path of the light passing through the transmissive document.

In addition to the above-mentioned design, the invention provides a calibration mechanism used in a scanner for scanning transmissive documents and reflective documents.

SUMMARY OF THE INVENTION

It is therefore an object of the invention to provide a calibration mechanism of a scanner, in which a calibration element is rotated relative to a light source and the calibration effect can be achieved without moving the calibration element to another location.

Another object of the invention is to provide a calibration mechanism of a scanner having a simplified calibration mechanism, which optimizes the original space of the scanner.

The invention achieves the above-identified object by providing a calibration mechanism including a second light source and a first light source. Also, the mechanism of the invention includes a calibration element and a rotation element, which are combined together. The calibration element formed with an opening is mounted on and surrounds the second light source, while the rotation element can rotate the calibration element. The invention further includes a scanning module, in which the first light source is disposed. In addition, the second light source is opposite or faces the scanning module.

When the shading correction is performed, the surface of the calibration element is disposed at a position opposite to the first light source. The light of the first light source illuminates on the calibration element and is reflected and enters the scanning module for performing the shading correction. When a transmissive document is being scanned, the opening of the calibration element is disposed at a position opposite to the scanning module. So, the light of the second light source passes through the transmissive document and then enters the scanning module for generating the image signal corresponding to the image of the document. When a reflective document is being scanned, the light of the first light source illuminates on the document. The reflected light of the document enters the scanning module, which generates the image signal corresponding to the image of the document.

DETAILED DESCRIPTION OF THE PREFERRED EMBODIMENT OF THE INVENTION

Figure 4:
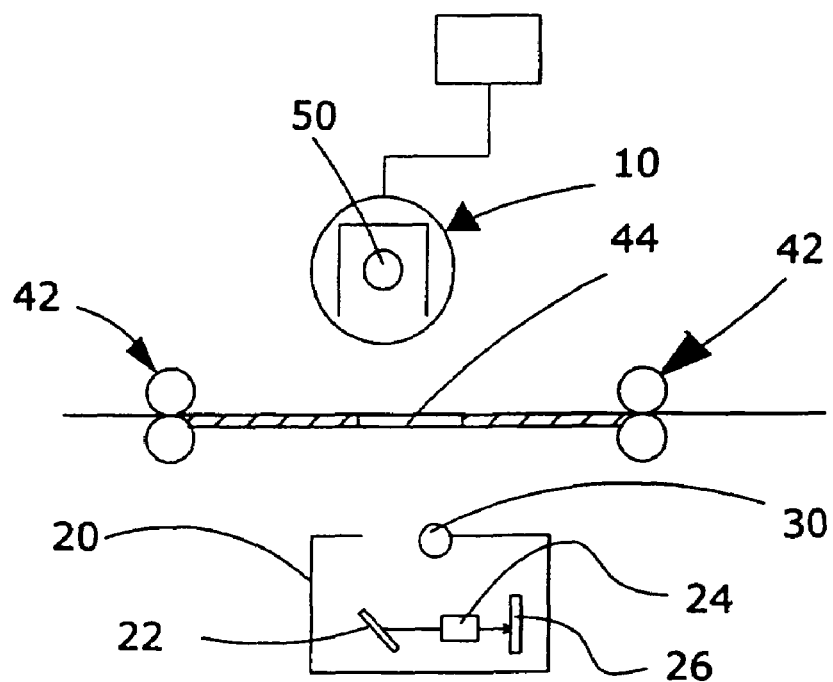
FIG. 4 is a schematic illustration showing a scanner equipped with the calibration mechanism of the invention.

FIG. 4 is a schematic illustration showing a scanner equipped with a calibration mechanism 10 and a scanning module 20 according to the invention. The scanner may be a sheet-fed scanner, or composed of a flatbed scanner and an automatic document feeder. The calibration mechanism 10 is disposed in the sheet-fed scanner or the automatic document feeder.

Taking the sheet-fed scanner as an example, the scanning module 20 is fixed inside the scanner and opposite the calibration mechanism 10. The scanning module 20, which receives light and generates a corresponding image signal, includes a reflecting mirror 22, a lens 24 and an optical device 26. The optical device 26 may be a charge coupled device (CCD) or any other device for receiving the light and generating the image signal corresponding to the image of the document.

A first light source 30 is disposed on the scanning module 20 and opposite the calibration mechanism 10. The first light source 30 provides the light for calibration and for the scanning of a reflective document.

A plurality of rollers 42 disposed in the scanner drives a document to move. A scan window 44 is disposed in the moving path of the document and opposite the scanning module 20.

It is to be noted that the calibration mechanism 10 and the scanning module 20 are located at opposite sides of the scan window 44, and the calibration mechanism 10 is combined with a second light source 50.

Figure 1:
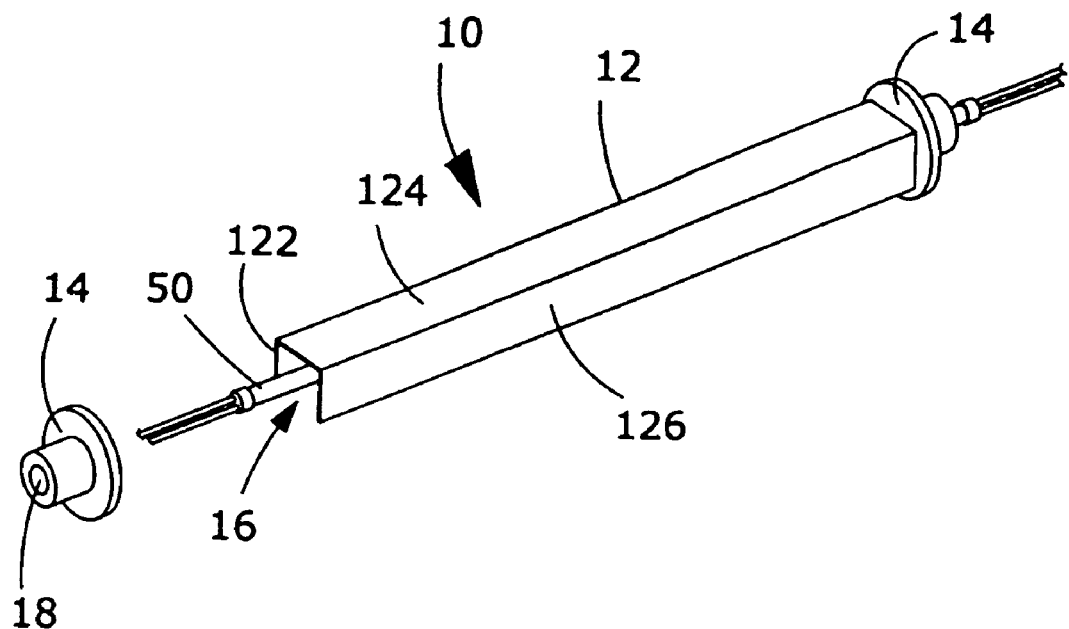
FIG. 1 is a perspective view showing a calibration mechanism of the invention.
Figure 2:
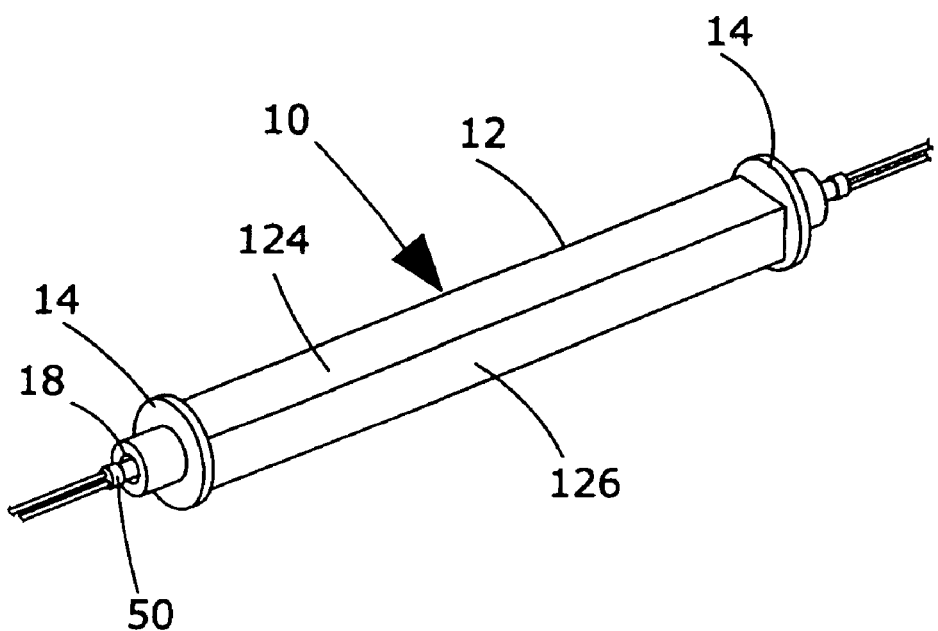
FIG. 2 is another perspective view showing the calibration mechanism of the invention.

As shown in FIGS. 1 and 2, the calibration mechanism 10 includes a calibration element 12 and two rotation elements 14. The calibration element 12 may be a rectangular casing and formed with a longitudinal opening 16 along a longitudinal direction of the casing. The second light source 50 is enwrapped by the calibration element 12

More particularly, the calibration element 12 may include three plate surfaces 122, 124 and 126, the plate surface 122 is adjacent to the plate surface 124 to form an angle of 90 degrees, and the plate surface 124 is adjacent to the plate surface 126 to form an angle of 90 degrees. The plate surface 122, 124 or 126 serves as the calibration sheet.

Theoretically, the calibration element 12 having only one plate surface can meet the requirement of the invention. In this embodiment, three plate surfaces are illustrated as an example.

The two rotation elements 14 are fixedly mounted on two ends of the calibration element 12. Each rotation element 14 is formed with a through hole 18 extending in an axial direction.

The calibration element 12 is disposed around the second light source 50. Two ends of the second light source 50 pass through the through holes 18 of the rotation elements 14, respectively.

Figure 3:
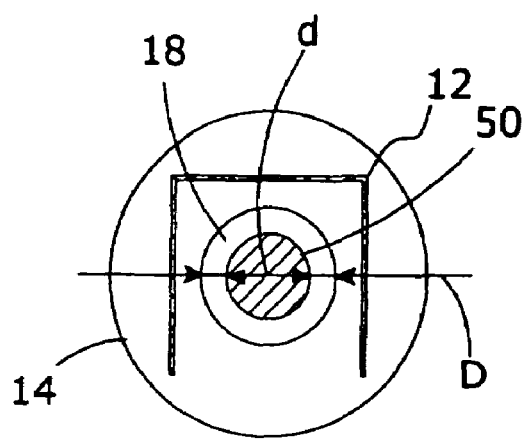
FIG. 3 is a schematically cross-sectional view showing a structure of the calibration mechanism of the invention.

Referring to FIG. 3, the second light source 50 has the diameter of "d" and the through hole 18 has the diameter of "D", wherein D>d. Consequently, the two ends of the second light source 50 can pass through the through holes 18, and it could prevent the rotating calibration element 12 and the rotation element 14 in motion from interfering with the second light source 50.

Figure 5:
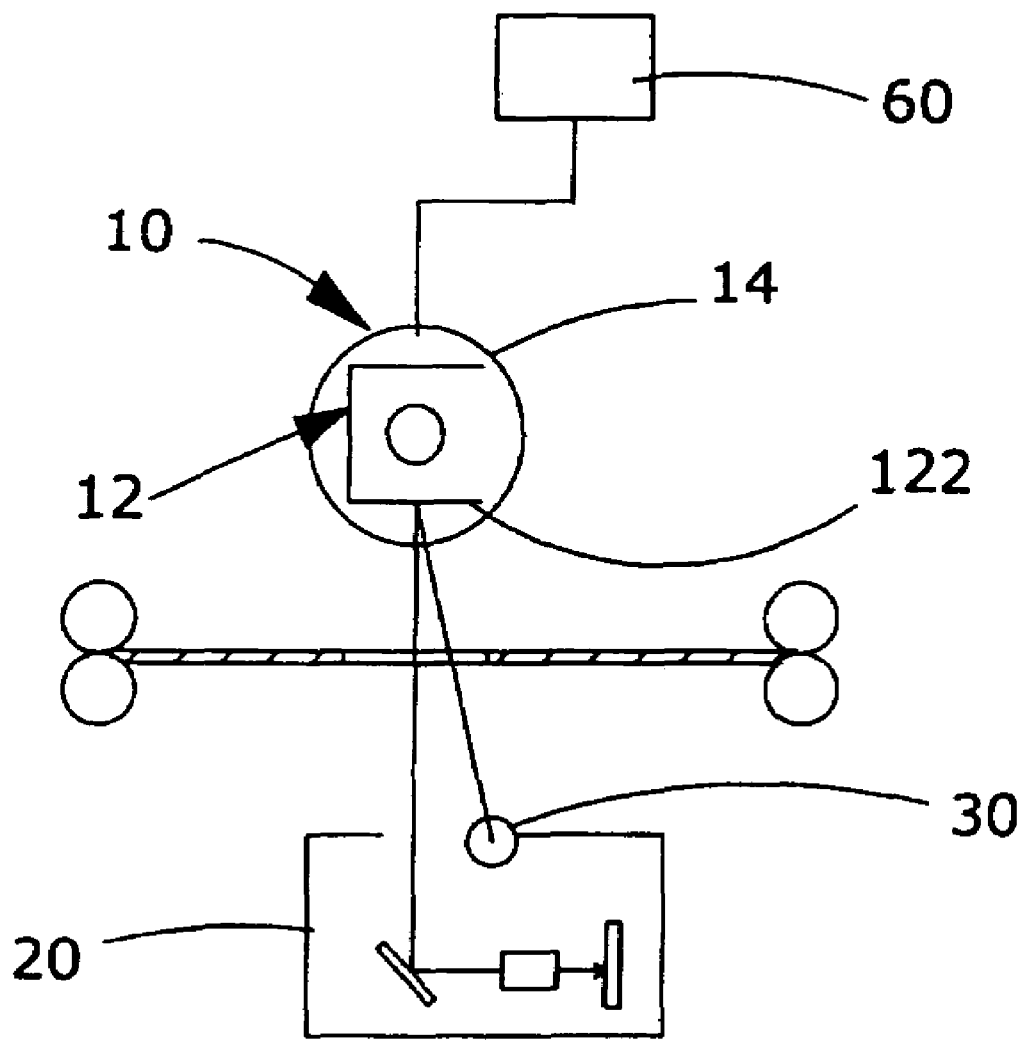
FIG. 5 is a schematic illustration showing an operational state when the calibration mechanism of the invention is executing the calibration function.

FIG. 5 is a schematic illustration showing an operational state when the calibration mechanism of the invention is executing the calibration function. The calibration mechanism 10 is electrically connected to a driving device 60, which provides power to drive the rotation element 14 and the calibration element 12 to rotate.

For example, when the calibration element 12 is rotated counterclockwise by 90 degrees, the plate surface 122 faces the scanning module 20. The light of the first light source 30 illuminates on the plate surface 122, which generates a reflected light. The reflected light enters the scanning module 20 and calculationsuch that the shading correction is performed.

Figure 6:
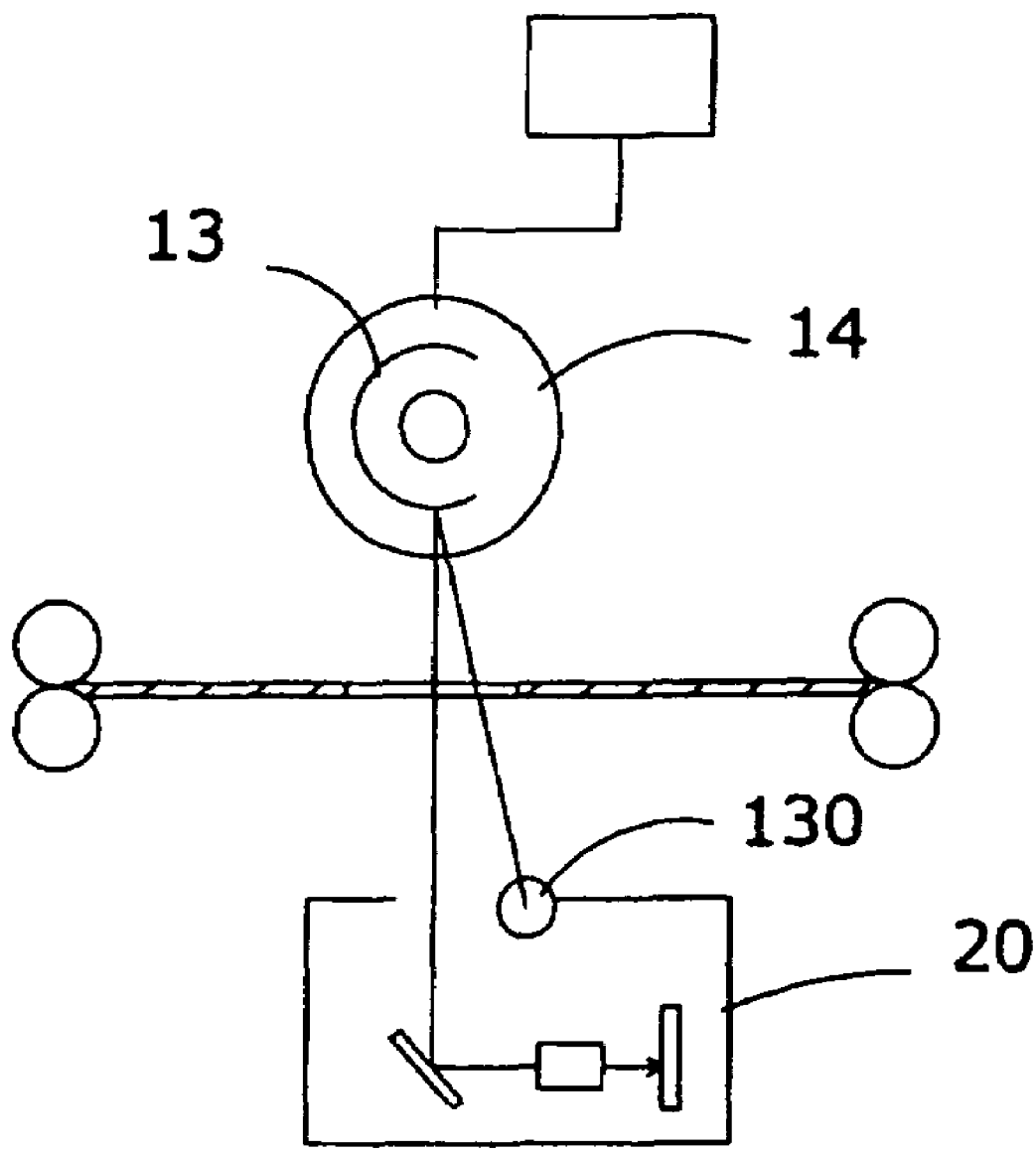
FIG. 6 shows that the calibration element of the invention has an arced surface.

As shown in FIG. 6, a calibration element 13 forms a cylindrical structure and is combined with the rotation element 14 except that the calibration element 13 has an arced surface.

When the light of the first light source 30 illuminates on the calibration element 13 and the calibration element 13 having the arced surface is rotated, the scanning module 20 can get multiple scan lines to serve as the reference for the shading correction.

Figure 7:
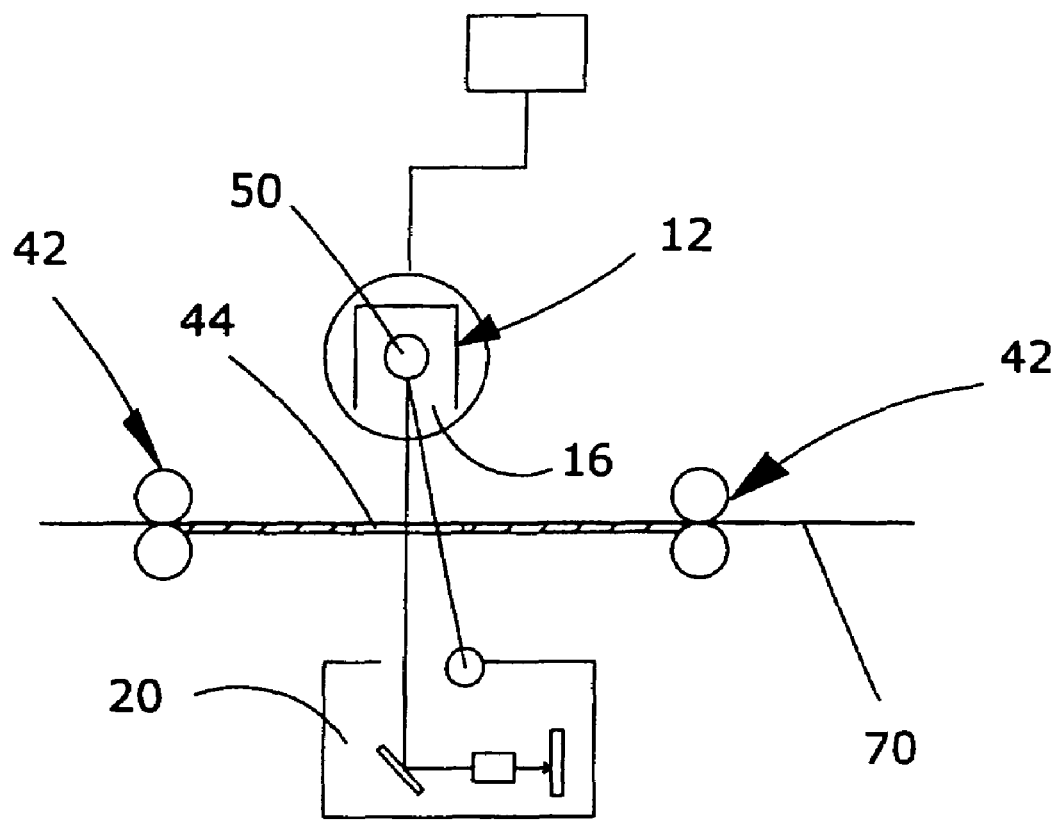
FIG. 7 is a schematic illustration showing an operational state when the calibration mechanism of the invention is scanning a transmissive document.

As shown in FIG. 7, when a transmissive document is being scanned, the opening 16 of the calibration element 12 faces the scanning module 20. A transmissive document 70 may be moved, relative to the scanning module 20, by the rollers 42. When the transmissive document 70 is moved across the scan window 44, the light of the second light source 50 passes through the transmissive document 70 and the scan window 44 and then enters the scanning module 20. The scanning module 20 generates the image signal, which corresponds to the image of the document, according to the acquired scan lines.

Figure 8:
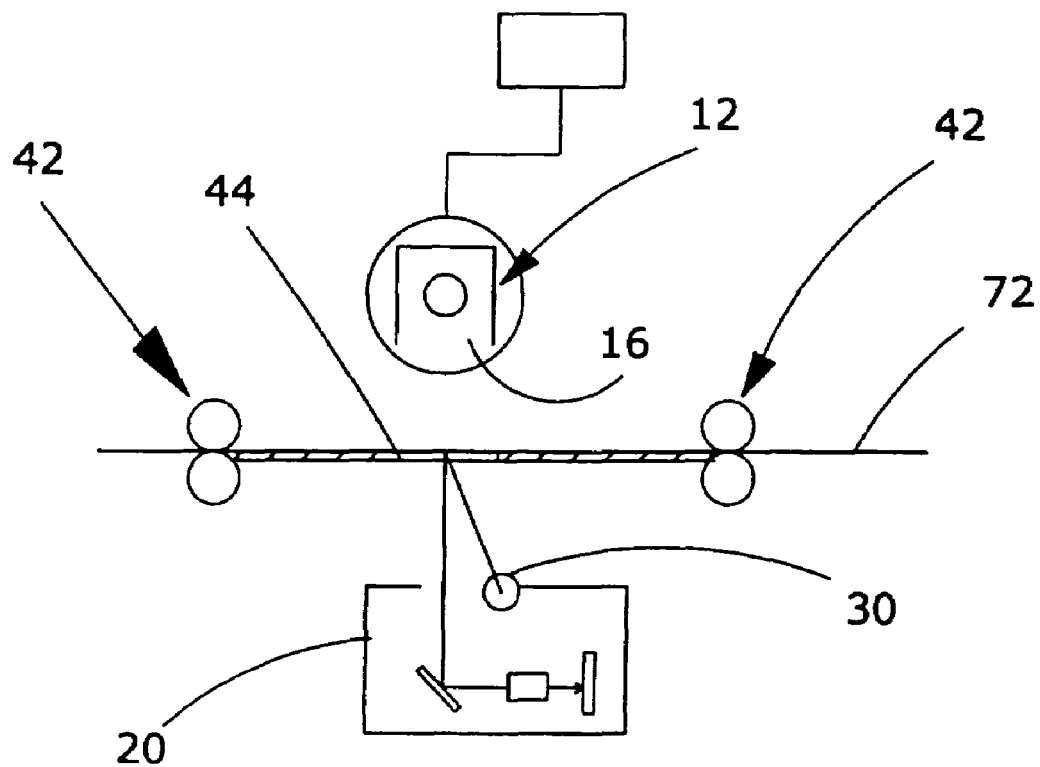
FIG. 8 is a schematic illustration showing an operational state when the calibration mechanism of the invention is scanning a reflective document.

As shown in FIG. 8, when a reflective document is being scanned, the opening 16 of the calibration element 12 may face the scanning module 20 or may not face the scanning module 20. A reflective document 72 may be moved, relative to the scanning module 20, by the rollers 42. When the document 72 passes through the scan window 44, the light of the first light source 30 illuminates on the document 72 and is then reflected and enters the scanning module 20. The scanning module 20 generates the image signal, which corresponds to the image of the document, according to the acquired scan line.

In order to prevent the lights emitted from the second light source 50 and the first light source 30 from interfering with each other, when the transmissive document 70 is being scanned, the second light source 50 provides the light for scanning while the first light source 30 is off. When the reflective document 72 is being scanned, the first light source 30 provides the light for scanning while the second light source 50 is off.

According to the above-mentioned design, when the shading correction before scanning is performed, the driving device 60 drives the calibration element 12, such that the light emitted from the first light source 30 illuminates on the surface of the calibration element 12 without the opening, and the scanning module 20 receives the reflected light. Thus, the calibration element 12 can finish the shading correction without having to be moved linearly. In addition, the invention structure is simple and can optimize the space of the scanner. In addition, the size of the combination of the calibration element 12 and the second light source 50 is small, so the calibration element 12 and the second light source 50 can be easily assembled in the sheet-fed scanner or the automatic document feeder to provide not only the calibration function but also the function of scanning the transmissive document.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A calibration mechanism of a scanner, disposed at a position opposite to a scanning module of the scanner and a first light source of the scanner, the scanning module receiving light and generating a corresponding image signal, the calibration mechanism comprising:

a second light source for providing the light for illuminating a transmissive document; and a calibration element, which is rotatably mounted on the second light source, wherein:

a surface of the calibration element is formed with an opening and the calibration element encloses the second light source; and the second light source is not rotated when the calibration element is rotated.

2. The calibration mechanism according to claim 1, wherein the calibration element rotates so that the opening of the surface of the calibration element faces the scanning module, wherein:

the light of the second light source passes through the opening of the calibration element and the transmissive document and enters the scanning module so that the transmissive document is scanned.

3. The calibration mechanism according to claim 1, wherein the calibration element rotates so that the opening of the surface of the calibration element does not face the scanning module, wherein:

the light emitted from the first light source is reflected by the surface of the calibration element and then received by the scanning module so as to perform shading correction of the scanning module.

4. The calibration mechanism according to claim 1, further comprising two rotation elements fixed onto two ends of the calibration element, wherein the rotation elements are driven to rotate the calibration element.

5. The calibration mechanism according to claim 4, wherein the rotation element is axially formed with a through hole, and the through hole has a diameter larger than a diameter of the second light source.

6. The calibration mechanism according to claim 1, being electrically connected to a driving device, wherein the driving device drives the calibration element to rotate.

7. The calibration mechanism according to claim 1, wherein the first light source is assembled on the scanning module.

8. The calibration mechanism according to claim 1, wherein the scanning module comprises a reflecting mirror, a lens and an optical device.

9. The calibration mechanism according to claim 8, wherein the optical device is a charge coupled device.

10. The calibration mechanism according to claim 1, wherein the calibration element forms a rectangular-shaped structure and has three plate surfaces.

11. The calibration mechanism according to claim 1, wherein the calibration element forms a cylindrical structure and the surface of the calibration element is an arced surface.

12. The calibration mechanism according to claim 1, wherein the first light source provides the light for scanning a reflective document.

13. The calibration mechanism according to claim 1, wherein the scanner is a sheet-fed scanner.

14. The calibration mechanism according to claim 1, wherein the scanner comprises a flatbed scanner and an automatic document feeder, and the calibration mechanism is disposed in the automatic document feeder.

* * * * *